C. C. PRATT.
AUTOMOBILE HEADLIGHT.
APPLICATION FILED DEC. 6, 1916.

1,240,780.

Patented Sept. 18, 1917.
2 SHEETS—SHEET 1.

Witnesses

C. C. Pratt
Inventor
by
Attorneys

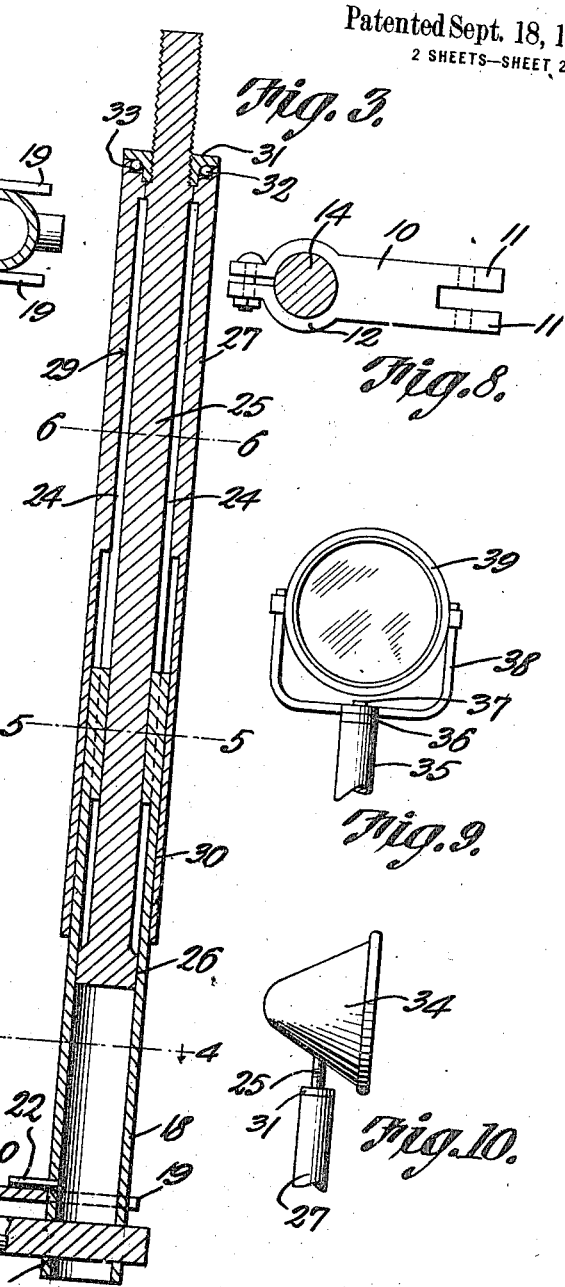

UNITED STATES PATENT OFFICE.

CHELSEA C. PRATT, OF MANKATO, MINNESOTA.

AUTOMOBILE-HEADLIGHT.

1,240,780.

Specification of Letters Patent.   Patented Sept. 18, 1917.

Application filed December 6, 1916.   Serial No. 135,433.

*To all whom it may concern:*

Be it known that I, CHELSEA C. PRATT, a citizen of the United States, residing at Mankato, in the county of Blue Earth and State of Minnesota, have invented new and useful Automobile-Headlights, of which the following is a specification.

The device forming the subject matter of this application is a means whereby the headlight of an automobile may be turned laterally, to follow the direction in which the wheels of the vehicle are turned.

The invention aims to provide novel means whereby relative vertical movement between the body portion of the vehicle and the axle thereof may take place, without disarranging the parts of the mechanism whereby the lamps are turned.

Another object of the invention is to provide a novel connection between the rotatable lamp-carrying member and the steering rod, which will admit of relative movements in various directions between the axle and the ground wheels on the one hand, and the vehicle body on the other.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Fig. 3 is a fragmental section showing the means whereby rotation is imparted to the lamps from the steering rod;

Fig. 4 is a cross section taken on the line 4—4 of Fig. 3;

Fig. 5 is a cross section taken on the line 5—5 of Fig. 3;

Fig. 6 is a cross section taken on the line 6—6 of Fig. 3;

Fig. 7 is a fragmental top plan showing a portion of the steering rod and parts carried thereby;

Fig. 8 is a fragmental vertical section taken through the steering rod, and illustrating a slight modification in the invention;

Fig. 9 is an elevation showing a modified means for mounting the lamp; and

Fig. 10 is an elevation showing the lamp and its mounting, in the preferred form.

Figure 1:
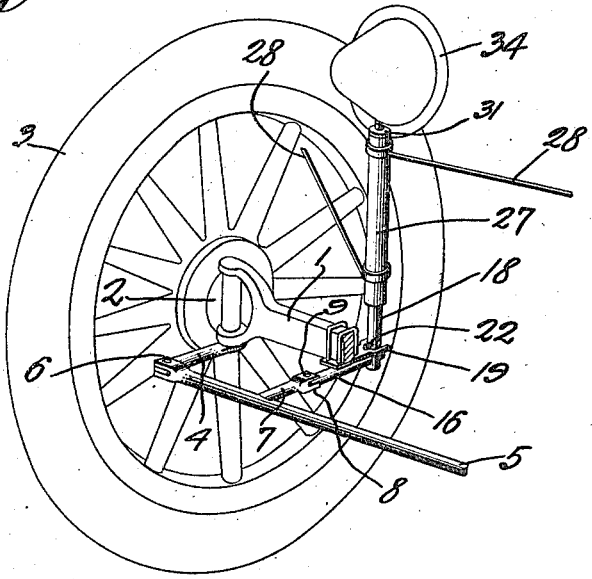
Figure 1 is a perspective view, showing a portion of an automobile, whereunto the device forming the subject matter of this application has been applied.
Figure 2:
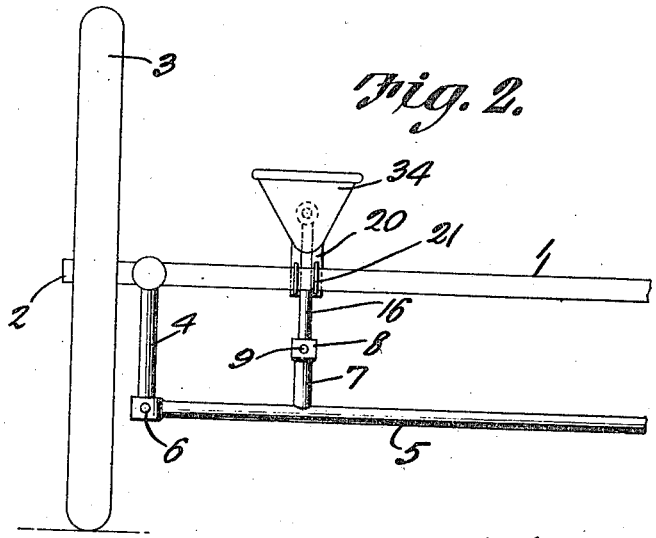
Fig. 2 is a top plan, diagrammatic in nature, and showing a portion of an automobile to which the head-light forming the subject matter of this application has been attached.

The numeral 1 designates the front axle of an automobile, the axle 1 carrying movable ends 2 on which front wheels 3 are journaled. The ends 2 of the axle 1 have arms 4 to which a steering rod 5 is pivoted as shown at 6. This construction is common and well understood in the art, and no novelty is claimed therefor, saving in so far as it may enter into combination with elements hereinafter described. Like mechanisms are provided for actuating the lamps of the vehicle, and since these mechanisms are duplicates of each other, but one of them need be shown or described, the description proceeding henceforward in the singular number.

The steering rod 5 has an integrally formed angularly disposed arm 7 having bifurcations 8. The arm 7 need not be formed integrally with the steering rod 5. As shown in Fig. 8, the steering rod appears at 14 and the arm is shown at 10, the same having bifurcations 11 as above described. In this form of the invention, the arm 10 is equipped with a clamp 12 engaging the steering rod 14 adjustably and detachably. The bifurcations 8, or the bifurcations 11 of Fig. 8, are adapted to receive a pivot pin 9.

The thinned end 15 of a rod 16 extends between the bifurcations 8 and is mounted on the pivot element 9. The rod 16 is circular in cross section adjacent its forward end and passes through an opening 17 formed in a tube 18. The rod 16 can rotate in the opening 17, or move endwise therein. The tube 18 is mounted to rotate between fingers 19 on a support 20 held on the axle 1 by means of U-bolts 21 or in any other suitable manner. Projecting rearwardly from the tube 18 is a pin 22 which rests on top of the support 20. The tube 18 has internal longitudinal ribs 23 slidable in guide ways 24 formed in a shaft 25. As shown at 26, the shaft 25 is of such a diameter as to fit closely within the tube 18. It is possible, however, for the tube 18 and the shaft 25 to have relative longitudinal movement with respect to each other.

The shaft 25 is received in an upright tubular bearing 27 carrying any suitable means 28 whereby the bearing may be held against vertical movement and against rotation on accessible parts of the vehicle body. The tubular bearing 27 has a bore, the upper portion 29 of which conforms to the diameter of the shaft 25. The lower portion of the bore of the bearing 27, indicated at 30, is of such a size as to receive closely but rotatably, the tube 18. The tube 18 can rotate or move longitudinally in the bearing 27. A cap 31 is threaded onto the upper end of the shaft 25 and coöperates with the upper end of the bearing 27, to prevent downward movement of the shaft. Antifriction balls 32 are interposed between the cap 31 and the upper end of the bearing 27, the bearing 27 being suitably recessed as shown at 33, to receive the balls. A lamp 34 may be mounted on the upper end of the shaft 25, as shown in Figs. 1 and 10. In Fig. 9, the bearing appears at 35, the same corresponding to the part 27. The cap is shown at 36, and the shaft appears at 37. The shaft 37 carries a yoke 38 on which the lamp 39 is mounted. Fig. 9 will render it evident that the lamp may be mounted on the upper end of the shaft in any desired way.

When the rod 5 is moved longitudinally to effect a steering of the vehicle, the arm 7 is carried transversely of the vehicle. The rod 16 is carried laterally, along with the arm 7. The rod 16 has a slight endwise movement in the opening 17 of the tube 18, as is necessary, since when the steering rod 5 is moved longitudinally, it moves, also, transversely, toward and away from the axle 1 to a slight extent. The rod 16 acts as a crank arm, rotating the tube 18, the latter being supported by the projection 22, on the member 20. When the tube 18 is rotated, the shaft 25 will be rotated also, because the shaft and the tube are interlocked for simultaneous rotation, by means of the ribs 23 on the tube 18 and the guideways 24 in the shaft 25. When the shaft 25 is rotated, the lamps 34 will be turned in the proper direction, to follow the wheels 3 of the vehicle.

In case relative vertical movement takes place between the body of the vehicle and the axle 1, as is inevitable, the tube 18 can slide vertically in the bearing 27, the latter being carried by the body portion of the vehicle, and the tube 18 being assembled with the axle 1. In case the body of the vehicle moves forwardly and rearwardly with respect to the axle 1, the tube 18 can slide, accordingly, between the fingers 19 of the support 20, the projection 22 being long enough so that the part 20 will uphold the tube 18 for rotation during the operation above described. During this operation, further, the rod 16 can slide longitudinally in the opening 17 of the tube 18. In case the axle 1 does not remain in horizontal parallelism with the body of the vehicle, that is, if one of the front wheels should be higher than the other, then the rod 16 can rotate in the opening 17 of the tube 18.

Having thus described the invention, what is claimed is:—

1. The combination with the steering rod and the running gear of a vehicle, of a bearing; means for supporting the bearing on the body of the vehicle; a longitudinally extensible shaft journaled in the bearing and comprising upper and lower parts which are provided with interengaging elements uniting said parts for simultaneous rotation and for relative longitudinal movement; means for supporting the upper part of the shaft on the bearing independently of the running gear, against vertical movement; means for supporting the lower part of the shaft on the running gear; means for connecting the lower part of the shaft with the steering rod; and a lamp carried by the upper part of the shaft.

2. The combination with the steering rod and the running gear of a vehicle, of a bearing; means for supporting the bearing on the body of the vehicle; a longitudinally extensible shaft journaled in the bearing and comprising upper and lower parts which are provided with interengaging elements uniting said parts for simultaneous rotation and for relative longitudinal movement; means for supporting the upper part of the shaft on the bearing independently of the running gear, positively against vertical movement; means for supporting the lower part of the shaft on the running gear for rotation and for free sliding movement in a substantially horizontal plane responsive to the relative horizontal movements of the body of the vehicle and the running gear; means for connecting the lower part of the shaft with the steering rod; and a lamp carried by the upper part of the shaft.

3. The combination with the steering rod and the running gear of a vehicle, of a bearing; means for supporting the bearing on the body of the vehicle; a longitudinally extensible shaft journaled in the bearing and comprising upper and lower parts which are provided with interengaging elements uniting said parts for simultaneous rotation and for relative longitudinal movement; means for supporting the upper part of the shaft on the bearing; means for supporting the lower part of the shaft on the running gear; a lamp carried by the upper part of the shaft; a rod mounted in the lower part of the shaft for rotation and for longitudinal sliding movement; and means for connecting the said rod with the steering rod of the vehicle.

4. The combination with the steering rod and the running gear of a vehicle, of a bearing; means for supporting the bearing on the body of the vehicle; a longitudinally extensible shaft journaled in the bearing and comprising upper and lower parts which are provided with interengaging elements uniting said parts for simultaneous rotation and for relative longitudinal movement; means for supporting the upper part of the shaft on the bearing; means for supporting the lower part of the shaft on the running gear for rotation and for limited sliding movement in a substantially horizontal plane; a lamp carried by the upper part of the shaft; a rod mounted in the lower part of the shaft for rotation and for longitudinal sliding movement; and means for pivotally connectting the said rod with the steering rod of the vehicle.

5. In a device of the class described, a bearing; means for supporting the bearing on the body of a vehicle; a shaft journaled in the bearing; a lamp carried by the shaft; a support; means for upholding the support from the running gear of the vehicle, the shaft being mounted in the support for limited sliding movement in a substantially horizontal plane; a steering rod; and means for operatively connecting the shaft with the steering rod.

6. In a device of the class described, a bearing; means for upholding the bearing from the body of a vehicle; a shaft journaled in the bearing; a lamp carried by the shaft; a support; means for connecting the support with the running gear of a vehicle; means carried by the shaft and engaging the support to uphold the shaft for rotation thereon; a rod mounted to slide endwise and to rotate in the shaft; a steering rod; and means for operatively connecting the steering rod with the first specified rod.

7. In a device of the class described, a bearing; means for supporting the bearing from the body of a vehicle; a shaft journaled in the bearing; a lamp carried by the shaft; a support, the shaft being mounted for limited sliding movement in the support in a substantially horizontal plane; means carried by the shaft and coöperating with the support to uphold the shaft; means for connecting the support with the running gear of the vehicle; a rod mounted to slide endwise and to rotate in the shaft; a steering rod; and means for operatively connecting the steering rod with the first specified rod.

In testimony that I claim the foregoing as my own, I have hereto affixed my signature in the presence of two witnesses.

CHELSEA C. PRATT.

Witnesses:
  C. O. DAILEY,
  MAMIE ALBERT.